Patented June 5, 1951

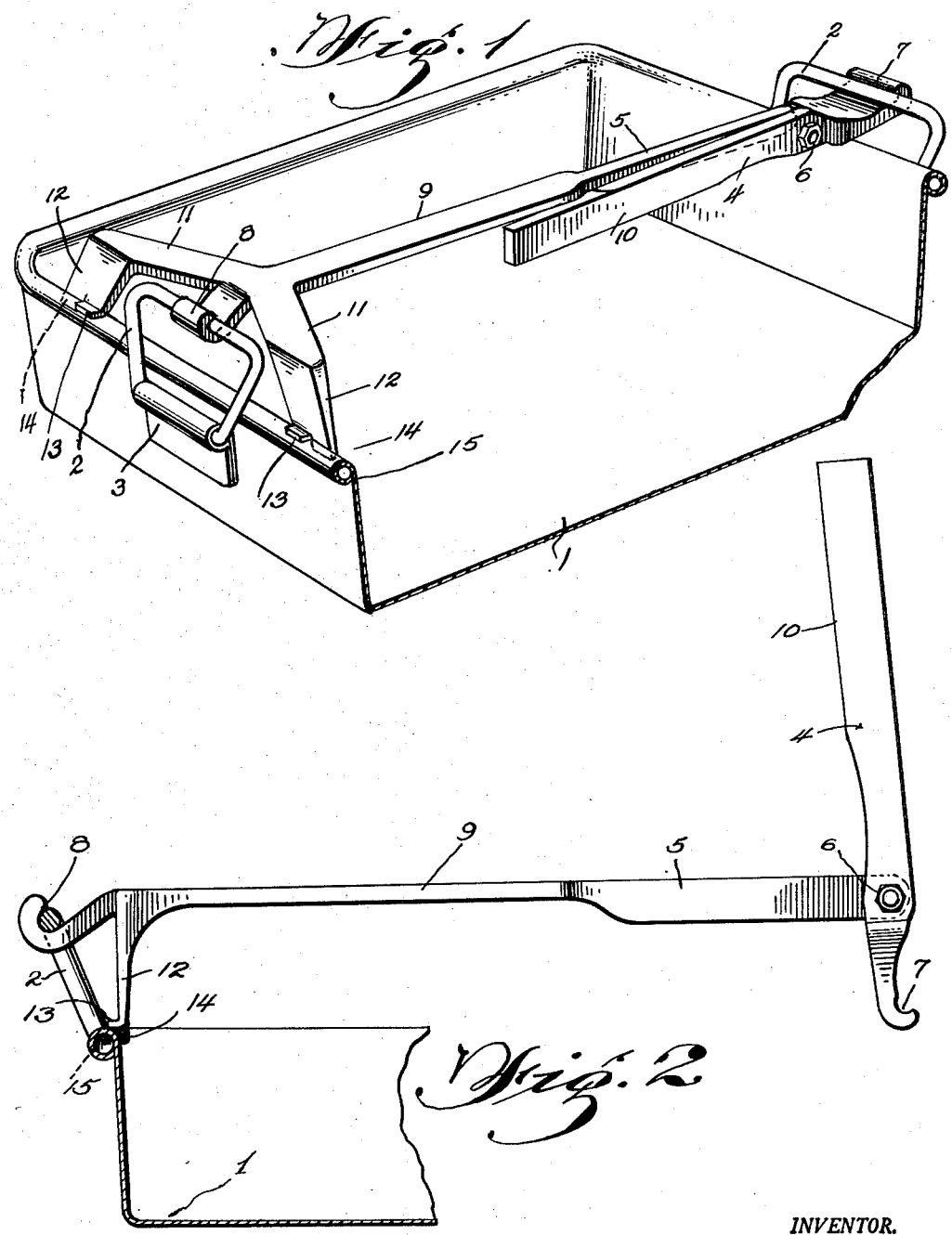

2,555,376

UNITED STATES PATENT OFFICE 2,555,376

PAN LIFTER

Harold A. Schwartz, Cleveland, Ohio

Application February 26, 1947, Serial No. 730,927

8 Claims. (Cl. 294—28)

(Granted under the act of March 3, 1883, as amended April 30, 1928; 370 O. G. 757)

The invention described herein, if patented may be manufactured and used by or for the Government for governmental purposes, without the payment to me of any royalty thereon.

The present invention relates to lifting devices for bake pans and the like and has for its primary object to provide a lifter which engages the pan in a manner to prevent accidental tilting of the pan when supported by the lifter.

Another object of the invention consists in providing a lifter of extremely simple construction embodying only two movable parts, and one which may be easily and simply applied to and removed from a pan or other similar container provided with handles.

Other objects and advantages of the invention will be apparent from the following description when taken in connection with the accompanying drawings, in which, Figure 1 is a perspective view of the lifter or handle applied to a bake pan, and Figure 2 is a side elevational view of the lifter with the movable element in position ready for attachment to a pan.

More specifically, the numeral 1 indicates a bake pan or the like such as are used for browning potatoes, etc., and which is provided with handles 2 at opposite ends of the pan. The handles in the present disclosure are pivoted on the outer walls of the pan ends as indicated by the numeral 3 and are shown as swung up into an operative position.

The pan lifter comprises two pivoted bars 4 and 5 pivotally connected together as indicated by numeral 6. The bar 4 is provided with a hook 7 on its outer or free end and the bar 5 is provided with a similar hook 8.

In the present embodiment of the invention, the bar 5 extends substantially the full length of the pan and is provided with a flattened portion 9 to serve as a gripping portion; while the bar 4 is provided with an extension 10 adapted to overlap a substantial portion of the length of bar 5 so that when the hand of the operator grasps the lifter midway of its length, it will envelop the inner end of the extension 10 of bar 4 as well as the mid-portion or flattened portion 9 of the bar 5 so as to maintain the bars 4 and 5 in substantially the same horizontal plane while the hooks 7 and 8 are in engagement with the handles 2 of the pan.

In order to avoid the possibility of relative movement between the lifter and pan during a lifting operation, the bar 5 is provided with a pair of arms 11 formed with downwardly extending portions 12 located on opposite sides of the hook 8. The lower ends of the arms 12 may be provided with fingers 13 and 14 adapted to more or less straddle the side wall or bead 15 of the pan 1. In the present illustration of the invention, the fingers 13 extend horizontally to engage the top of the bead while the fingers 14 extend downwardly to engage the inner wall of the bead or pan.

In the operation of the device, when it is desired to place a loaded pan in the oven or otherwise move it from place to place, the arm 4 is swung about its pivot 6 to a position substantially as indicated in Figure 2, the hook 8 is then engaged over one of the handles 2 and the bar 5 is swung downwardly to a more or less horizontal position. Thereafter, the bar 4 is swung downwardly to substantially the plane of the bar 5 so as to engage the hook 7 over the other handle 2. The hand of the operator then grasps the lifter midway of its length so as to envelop portions of the handle portions 9 and 10 to transport the pan to the desired location in a stove or elsewhere. In this engagement of the hooks 7 and 8 with the handles 2 of the pan, the fingers 13, 14 are automatically brought into positions to engage various portions of the bead 15 on opposite sides of the hook 8 so as to positively prevent any relative movement of the pan with respect to the lifter.

The invention has been shown and described in considerable detail but obviously various minor changes may be made in the structure of the lifter without departing from the spirit of the invention and it is accordingly intended that such changes be included within the scope of the appended claims.

I claim:

1. A lifter for bake pans provided with handles, comprising a pair of pivoted bars, hooks formed on the free ends of the bars for engaging said handles, and means adjacent one of the hooks for engaging the pan body to prevent relative movement between it and the lifter.

2. A lifter for bake pans provided with handles, comprising a pair of pivoted bars, hooks on the free ends of the bars for engaging said handles, an extension on one of the bars adapted to overlap the other bar when the lifter is in operative position, and means on the lifter for engaging the pan body to prevent relative movement between it and the lifter.

3. A lifter for bake pans provided with handles, comprising a pair of pivoted bars, hooks formed on the free ends of the bars for engaging said handles, and a pair of arms adjacent one of said hooks for engaging the pan body when the lifter is in operative position.

4. A lifter for bake pans provided with handles, comprising a pair of pivoted bars, hooks formed on the free ends of the bars for engaging said handles, and a pair of arms adjacent one of said hooks and disposed on opposite sides thereof.

5. A lifter for bake pans provided with handles, comprising a pair of pivoted bars, hooks formed on the free ends of the bars for engaging said handles, a pair of arms adjacent one of said hooks and disposed on opposite sides thereof, and fingers on the end of each arm adapted to straddle the rim of the pan.

6. A lifter for bake pans provided with handles, comprising a pair of pivoted bars, hooks formed on the free ends of the bars for engaging said handles, a pair of outwardly and downwardly extending arms on one of said bars, and fingers on the end of each arm for engaging the rim of the pan.

7. A lifter for bake pans provided with handles, comprising a pair of pivoted bars, hooks formed on the free ends of the bars for engaging said handles, the effective length of said bars when in operative position being substantially the same as the distance between said handles, an extension on one of the bars adapted to overlap the other bar when in operative position, and means on the lifter for engaging the pan body to prevent relative movement between it and the lifter.

8. A lifter for bake pans provided with handles, comprising a pair of pivoted bars, hooks on the free ends of the bars for engaging the handles, the pivot for said bars being located remote from the hook of one bar and adjacent the hook of the other bar, said last-named bar having an extension which overlaps a portion of the other bar when the lifter is in operative position, and means of the lifter for engaging the pan body to prevent relative movement between it and the lifter.

HAROLD A. SCHWARTZ.

REFERENCES CITED

The following references are of record in the file of this patent:

UNITED STATES PATENTS

| Number | Name | Date |
|---|---|---|
| 857,228 | Boyd | June 18, 1907 |
| 906,986 | Anderson | Dec. 15, 1908 |
| 1,355,050 | Kimball | Oct. 5, 1920 |
| 1,533,853 | Grant | Apr. 14, 1925 |
| 1,763,965 | High | June 17, 1930 |
| 1,991,307 | Worden | Feb. 12, 1935 |